(12) United States Patent
Kondoh (10) Patent No.: US 8,119,332 B2
(45) Date of Patent: *Feb. 21, 2012

(54) METHOD FOR MANUFACTURING COORDINATE DETECTOR

(75) Inventor: Koichi Kondoh, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 451 days.

This patent is subject to a terminal disclaimer.

(21) Appl. No.: 12/464,939

(22) Filed: May 13, 2009

(65) Prior Publication Data

US 2009/0283498 A1   Nov. 19, 2009

(30) Foreign Application Priority Data

May 19, 2008 (JP) .................................. 2008-130858

(51) Int. Cl.
  *G03F 7/20* (2006.01)
  *G06F 3/041* (2006.01)
  *G06F 3/045* (2006.01)
  *B44C 1/22* (2006.01)

(52) U.S. Cl. ............................ 430/311; 345/174; 216/65

(58) Field of Classification Search .................. 345/174; 430/311; 216/65
See application file for complete search history.

(56) References Cited

U.S. PATENT DOCUMENTS

| 2001/0036504 | A1 | 11/2001 | Bottari et al. |
| 2007/0013678 | A1 | 1/2007 | Nakajima et al. |
| 2009/0284493 | A1 * | 11/2009 | Kondoh .................. 345/174 |

FOREIGN PATENT DOCUMENTS

| JP | 10-83251 A | 3/1998 |
| JP | 2001-125724 A | 5/2001 |
| JP | 2007-25904 A | 2/2007 |
| JP | 2007-249260 | 9/2007 |
| KR | 2002-91297 | 12/2002 |
| KR | 2008-43202 | 5/2008 |

OTHER PUBLICATIONS

English translation by machine language for the office action dated Jan. 7, 2011 issued by Koran Patent Application No. 1020090041703.*
Office Action dated Jan. 7, 2011 issued with repect to the corresponding Korean Patent Application No. 10-2009-0041703.

* cited by examiner

*Primary Examiner* — Shean Wu
(74) *Attorney, Agent, or Firm* — IPUSA, PLLC (57) ABSTRACT

A method for manufacturing a coordinate detector having a resistive film formed on a substrate formed of an insulating material and a common electrode for applying a voltage to the resistive film. The substrate includes a quadrangular shape. The method includes the steps of a) forming first resistive film removal regions by removing predetermined first regions of the resistive film provided along a peripheral edge of the substrate, b) forming the common electrode on the first resistive film removal regions, c) applying voltage to the resistive film, d) measuring an electric potential of the resistive film, e) calculating second resistive film removal region data according to the measured electric potential, and f) forming second resistive film removal regions by irradiating a laser beam to predetermined second regions of the resistive film according to the calculated second resistive film removal region data.

6 Claims, 12 Drawing Sheets

METHOD FOR MANUFACTURING COORDINATE DETECTOR

BACKGROUND OF THE INVENTION

1. Field of the Invention

The present invention generally relates to a method for manufacturing a coordinate detector.

2. Description of the Related Art

Examples of input devices for computer systems include touch panels. The touch panel is mounted on a display, and can detect a coordinate position on the display and obtain a detection signal corresponding to the coordinate position. The touch panel allows direct, simple, and intuitive inputting.

Various systems are proposed for touch panels, such as those using resistive films, those using optical imaging, and those using capacitive coupling. Commonly used are touch panels of a resistive-film type, which are simple in structure and easy to control. There are several types of low-resistance-system touch panels depending on the arrangement of electrodes on resistive films, such as a four-wire type, a five-wire type, and an eight-wire type.

Of those, compared with four-wire or eight-wire resistive-film touch panels, five-wire touch panels are free of the problem of edge sliding, which is a defect in the four-wire type and the eight-wire type, because the conductive film of the upper substrate placed on the operation surface side is used only for reading an electric potential. Therefore, five-wire touch panels are used in an environment of hard usage or where a long useful service life is desired.

Figure 1:
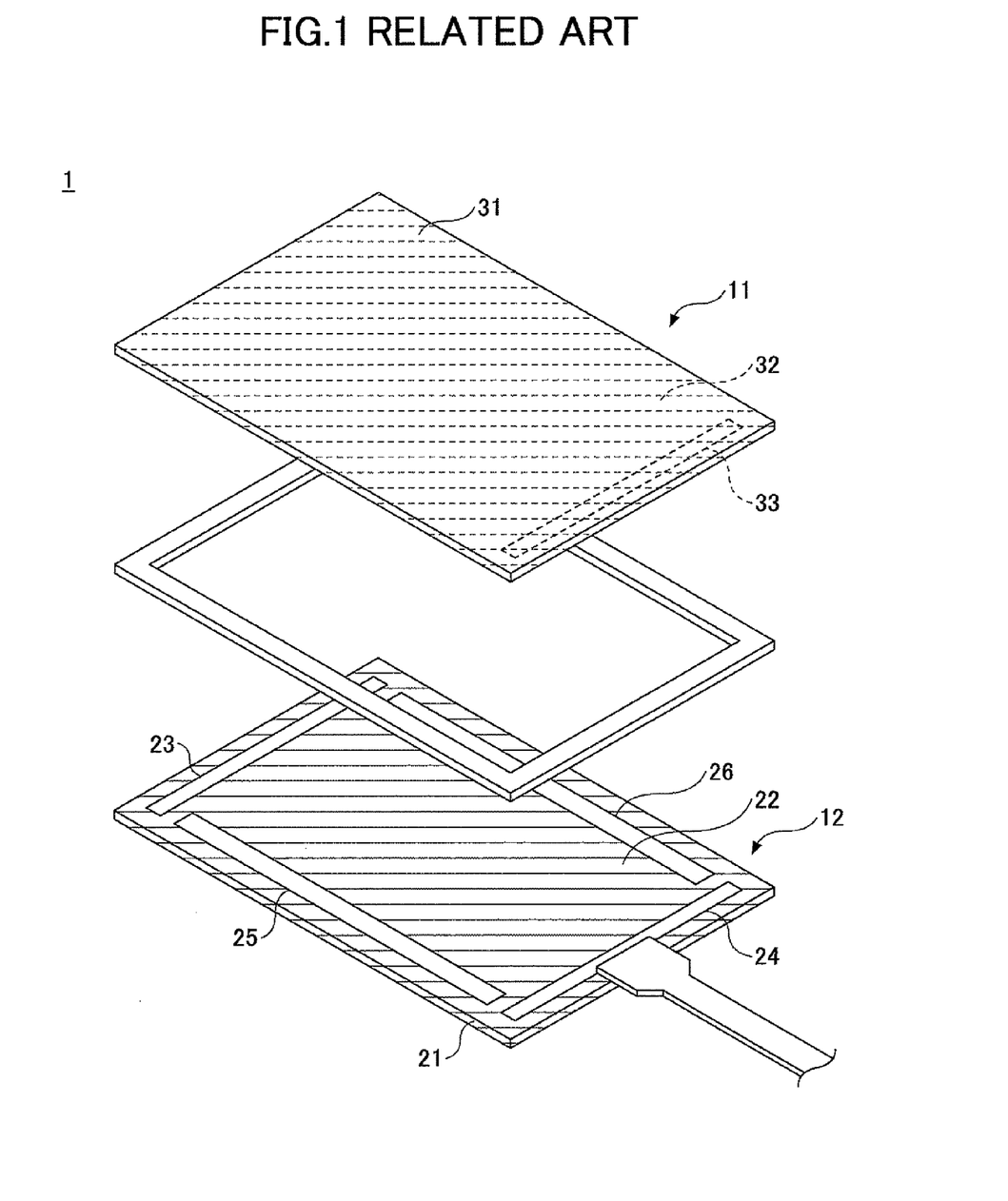
FIG. 1 is a diagram illustrating a five-wire resistive-film touch panel.

FIG. 1 is a diagram illustrating a five-wire resistive-film touch panel.

Referring to FIG. 1, a five-wire resistive-film touch panel 1 includes an upper substrate 11 and a lower substrate 12.

The lower substrate 12 includes a glass substrate 21 and a transparent resistive film 22 formed on the entire surface of the glass substrate 21. X-coordinate detection electrodes 23 and 24 for detecting coordinates of the x-axis and y-coordinate detection electrodes 25 and 26 for detecting coordinates of the y-axis are formed on the transparent resistive film 22.

The upper substrate 11 includes a film substrate 31 and a transparent resistive film 32 formed on the film substrate 31. A coordinate detection electrode 33 for detecting coordinates is formed on the transparent resistive film 32.

First, application of voltage to the x-coordinate detection electrodes 23 and 24 causes a distribution of electric potential in the directions of the x-axis of the transparent resistive film 22 on the lower substrate 12. At this point, the x-coordinate of a position where the upper substrate 11 contacts the lower substrate 12 can be detected by detecting the electric potential in the transparent resistive film 22 of the lower substrate 12.

Next, application of voltage to the y-coordinate detection electrodes 25 and 26 causes a distribution of electric potential in the directions of the y-axis of the transparent resistive film 22 on the lower substrate 12. At this point, the y-coordinate of the position where the upper substrate 11 contacts the lower substrate 12 can be detected by detecting the electric potential in the transparent resistive film 22 of the lower substrate 12.

At this point, how to distribute electric potential uniformly in the transparent resistive film 22 of the lower substrate 12 becomes an issue in this type of touch panel. Japanese Laid-Open Patent Application No. 10-83251 discloses providing peripheral electric potential distribution correction patterns in multiple stages for a uniform distribution of electric potential in the transparent resistive film 22 of the lower substrate 12. Japanese Laid-Open Patent Application No. 2001-125724 discloses providing a common electrode so as to encircle an input surface. Japanese Laid-Open Patent Application No. 2007-25904 discloses forming an opening in an insulating film provided on a transparent resistive film and applying an electric potential through the opening.

It is desired that coordinate detectors have narrower frames because of reduction in the size of apparatuses on which coordinate detectors are to be mounted. However, it is difficult to narrow the frame of the coordinate detector described in Patent Document 1 because electric potential distribution correction patterns are provided in multiple stages in the periphery.

According to the method described in Patent Document 2, which provides a common electrode around the input surface, there is a problem in that the distribution of electric potential in the transparent resistive film is disturbed unless the ratio of the resistance of the transparent resistive film to the pattern resistance is high.

Further, according to the method described in Patent Document 3, which provides an opening in the insulating film that has been formed, the above-described problems can be solved, but the manufacturing process becomes complicated. In particular, variations in material resistances or variations in resistance during manufacture may cause a decrease in the yield of product manufacturing.

SUMMARY OF THE INVENTION

The present invention may provide a method for manufacturing a coordinate detector that substantially eliminates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a method for manufacturing a coordinate detector particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a method for manufacturing a coordinate detector having a resistive film formed on a substrate formed of an insulating material and a common electrode for applying a voltage to the resistive film, the substrate having a quadrangular shape, the method including the steps of: a) forming first resistive film removal regions by removing predetermined first regions of the resistive film provided along a peripheral edge of the substrate; b) forming the common electrode on the first resistive film removal regions; c) applying voltage to the resistive film; d) measuring an electric potential of the resistive film; e) calculating second resistive film removal region data according to the measured electric potential; and f) forming second resistive film removal regions by irradiating a laser beam to predetermined second regions of the resistive film according to the calculated second resistive film removal region data.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings. Next, a description is given of a method of manufacturing a coordinate detector according to this embodiment.

[Manufacturing Apparatus]

Figure 2:
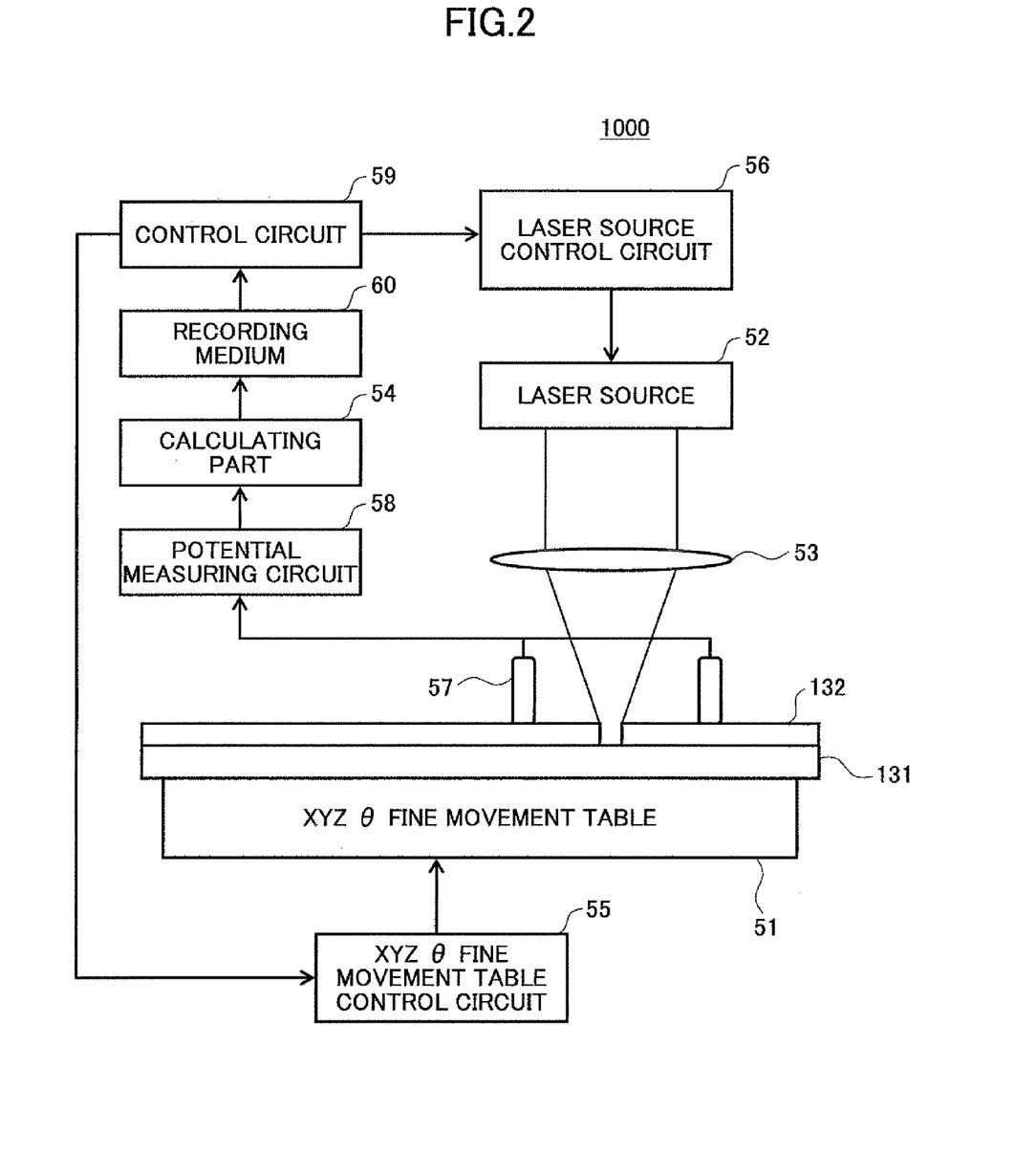
FIG. 2 is a schematic diagram illustrating a manufacturing apparatus used for performing a manufacturing method according to an embodiment of the present invention.

First, a manufacturing apparatus 1000 using a method for manufacturing a coordinate detector according to an embodiment of the present invention is described with reference to FIG. 2.

The manufacturing apparatus 1000 according to an embodiment of the present invention includes a an XYZ θ fine movement table 51, an XYZ θ fine movement table control circuit 55, a laser source 52, a laser source control circuit 56, an optical system 53, a probe 57, a potential measuring circuit 58, a calculating part 54, a control circuit 59, and a recording medium 60. The XYZ θ fine movement table 51 is a moving table capable of moving a glass substrate 131 in an X direction, a Y direction, a Z direction, and θ direction. The XYZ θ fine movement table control circuit 55 is for controlling the XYZ θ fine movement table 51. The laser source 52 is for irradiating a laser beam. The laser source control circuit 56 is for controlling the laser irradiation of the laser source 52. The optical source 53 is for condensing the laser beam onto a transparent resistive film 132 (e.g., made of ITO (Indium Tin Oxide)) formed on the glass substrate 131. The probe 57 is for measuring an electric potential on the surface of the transparent resistive film 132. The potential measuring circuit 58 is for measuring the electric potential based on a signal from the probe 57. The calculating part 54 is for calculating the range of the below-described resistive film removal regions based on the electric potential measured by the potential measuring circuit 58. The control circuit 59 is for controlling the XYZ θ fine movement table control circuit 55 and the laser source control circuit 56 for irradiating a laser beam from the laser source 52 at a predetermined timing while moving the glass substrate 131 with the XYZ θ fine movement table 51 according to the data calculated by the calculating part 54. The recording medium 60 is for storing various data therein.

With the manufacturing apparatus 1000 having such a configuration, a laser beam is irradiated from the laser source 52 to a predetermined region of the transparent resistive film 132 while moving the glass substrate 131 (on which the transparent resistive film 132 is formed) placed on the XYZ θ fine movement table 51 by controlling the movement of the XYZ θ fine movement table 51. In this embodiment, the laser beam is an excimer laser having a wavelength of approximately 355 nm. It is to be noted that the wavelength of the laser beam may range from 340-420 nm. Although the glass substrate 131 has a transmittance that allows a laser beam having a wavelength of 355 [nm] to pass therethrough, the transparent resistive film 132 has a low transmittance with respect to the laser beam having the wavelength of 355 [nm]. Accordingly, the laser beam transmits through a region of the glass substrate 131 where the transparent resistive film 132 is not formed but is absorbed at a region of the glass substrate 131 where the transparent resistive film 132 having low transmittance is formed. Accordingly, the irradiation of the laser beam creates ablation on the irradiated region of the transparent resistive film 132 and causes the irradiated region of the transparent resistive film 132 to be removed from the surface of the glass substrate 131. In this embodiment, the transparent resistive film 132 is removed by using a laser beam having a wavelength of 355 [nm].

Thereby, the transparent resistive film 132 formed on a predetermined region on the glass substrate 131 can be removed. The region of the transparent resistive film 132 to be removed is calculated by the calculating part 54 according to the data of the electric potential of the transparent resistive film 132 measured by the potential measuring circuit 58 via a probe 57 contacting the transparent resistive film 132. Accordingly, plural probes 57 for contacting the transparent resistive film 132 are provided. For example, 20 or more probes 57 are arranged two-dimensionally. The data of the area of the transparent resistive film 132 to be removed obtained by the calculation of the calculating part 54 are transmitted to the control circuit 59. In accordance with the data calculated by the calculating part 54, the control circuit 59 transmits corresponding control data to the XYZ θ fine movement table control circuit 55 and the laser source control circuit 56. More specifically, as described above, data is transmitted so that a laser beam from the laser source 52 is irradiated while moving the glass substrate 131 with the XYZ θ fine movement table 51 in correspondence with the area of the transparent resistive film 132 to be removed.

It is to be noted that the data of the region of the transparent resistive film to be removed calculated by the calculating part 54 are stored in the recording medium 60. In a case of forming first resistive film removal regions 133 and a common electrode 134 having a same pattern or shape, a second resistive film removal regions 233 may be formed by irradiating a laser beam from the laser source 52 based on the data stored in the recording medium 60. Since the same potential distribution can be anticipated in a case where the first resistive film 134 and the common electrode 134 have the same pattern and shape, there would be no need to measure the electric potential for each glass substrate, and the second resistive film removal region 233 can be formed. As a result, manufacturing efficiency can be improved.

[Manufacturing Method]

Next, a method for manufacturing a coordinate detector according to an embodiment of the present invention is described. More specifically, a method for manufacturing the lower substrate according to an embodiment of the present invention is described with reference to FIGS. 3, 4, and 7.

Figure 3:
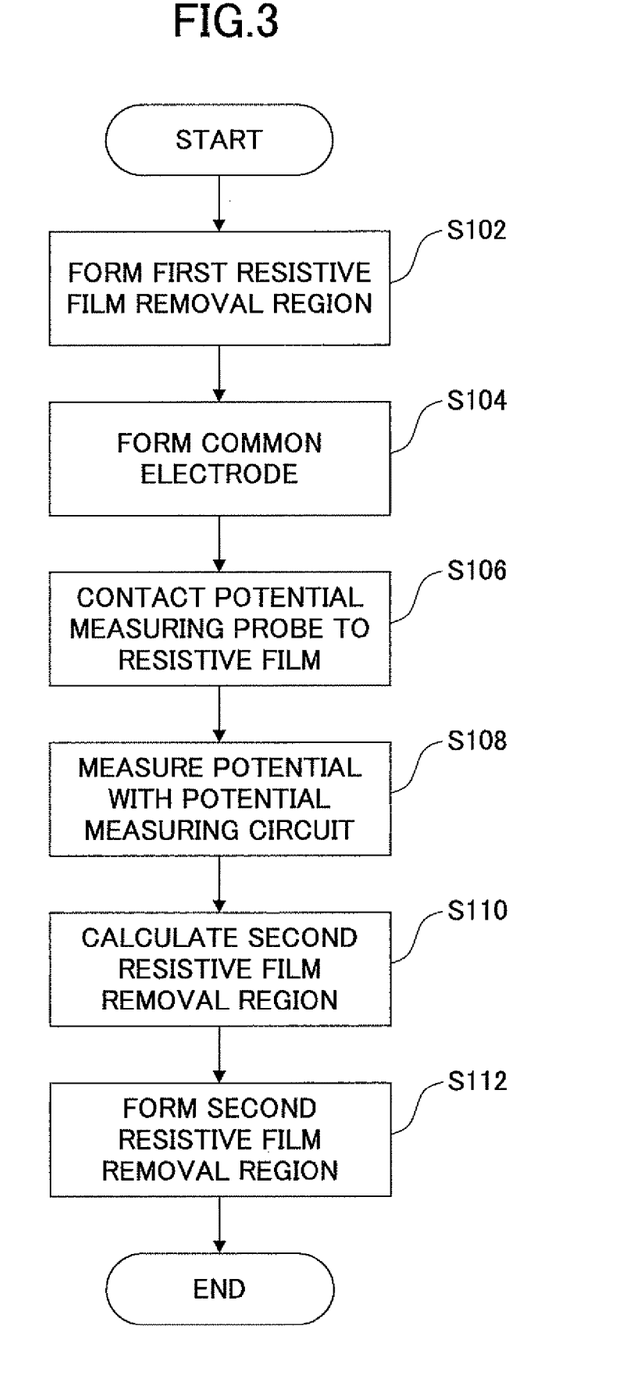
FIG. 3 is a flowchart illustrating the manufacturing method according to an embodiment of the present invention.
Figure 4A:
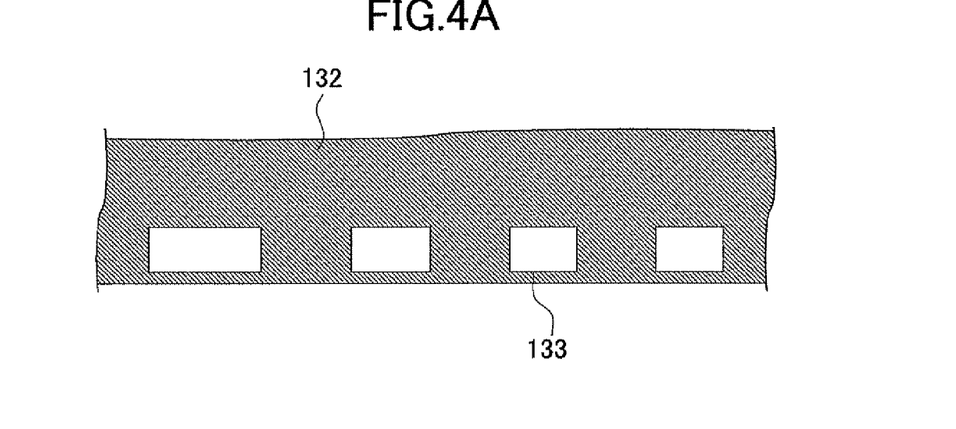
FIGS. 4A-4C are top plan views illustrating a configuration of first and second resistive film removal regions formed by the manufacturing method according to an embodiment of the present invention.

First, in Step S102, first resistive film removal regions 133 are formed on a glass substrate 131 on which a transparent resistive film 132 (e.g., ITO) is formed by, for example, sputtering or vacuum evaporation. The first resistive film removal regions 133 are formed along a peripheral edge of the glass substrate 131. Accordingly, predetermined regions of the first resistive film removal regions 133 are removed. FIG. 4A is a top plan view illustrating a state where the first resistive film removal regions 133 are formed according to an embodiment of the present invention.

Figure 4B:
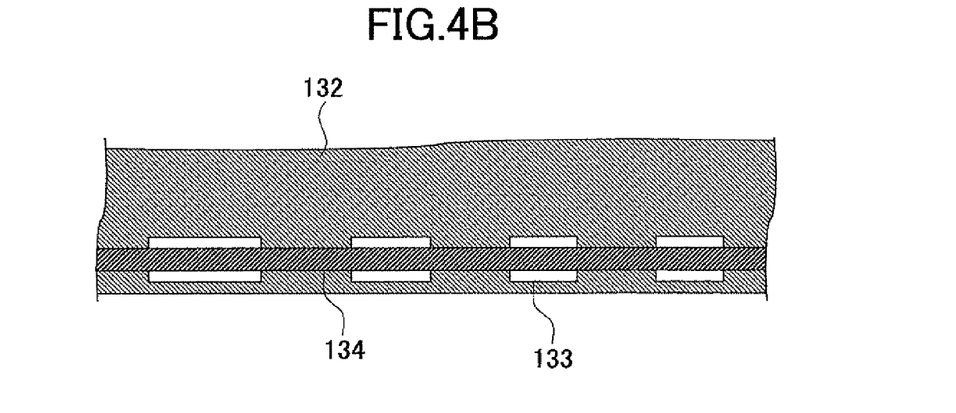

Then, in Step S104, a common electrode 134, which is formed of Ag—C, is formed on the first resistive film removal regions 133. For example, the common electrode 134 is formed by printing a pattern of paste including Ag—C by screen printing and thereafter baking the paste. FIG. 4B is a top plan view illustrating a state where the common electrode 134 is formed according to an embodiment of the present invention.

Then, in Step S106, the probe 57 for measuring electric potential is set into contact with the surface of the transparent resistive film 132.

Then, in Step S108, the potential measuring circuit 58 measures the electric potential of the transparent resistive film 132 via the probe 57. Thereby, the state of the potential distributed in the transparent resistive film 132 can be attained. In order to attain the electric potential, electric potential is supplied from the common electrode 134 to the first transparent resistive film regions 133.

Then, in Step S110, regions for further removing the transparent resistive film 132 are calculated by the calculating part 54 according to data attained by the potential measuring circuit 58. For example, in a case where a theoretical potential distribution and the potential distribution measured in Step S108 do not match, the calculating part 54 calculates, for example, the shape and the pitch of second resistive film removal regions 233 so that the actual potential distribution becomes close to the theoretical potential distribution. In a case where a region of the transparent resistive film 132 has a measured potential distribution (potential distribution measured in Step S108) higher than the theoretical potential distribution, the second resistive film removal region 233 corresponding to such region is formed with a large size. In a case where a region of the transparent resistive film 132 has a measured potential distribution (potential distribution measured in Step S108) substantially the same as the theoretical potential distribution, the second resistive film removal region 233 corresponding to such region is formed with a small size or not formed at all. As described below, the calculated data of the area to be removed from the transparent resistive film 132 (e.g., data regarding the shapes and pitches of second resistive film removal regions 233) are stored in the recording medium 60.

Figure 4C:
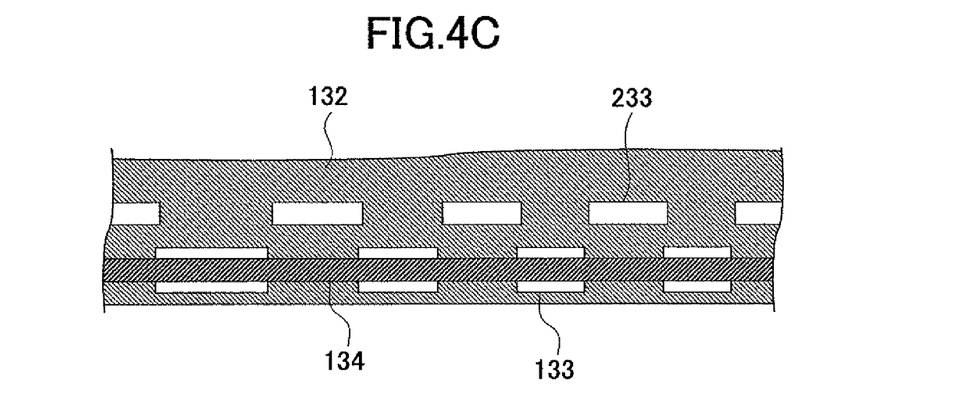

Then, in Step S112, the second resistive film removal regions 233 are formed by removing the transparent resistive film 132 by irradiating a laser beam from the laser source 52 to the while moving the glass substrate 131 with the XYZ θ fine movement table 51. More specifically, in this embodiment, regions of the transparent resistive film 132, which are to become the second resistive film removal regions 233, are removed by controlling the laser source 52 and the XYZ θ fine movement table 51 according to the data transmitted from the control circuit 59 to the laser source control circuit 56 and the XYZ θ fine movement table control circuit 55. FIG. 4C is a top plan view illustrating a state where the second resistive film removal regions 233 are formed.

Thereby, the forming of the first and second resistive film removal regions 133, 233 according to an embodiment of the present invention is completed. As illustrated in FIG. 4C, the second resistive film removal regions 233 are formed at an inner side with respect to the first resistive film removal regions 133 and the common electrode 134. In this embodiment, the uniformity of the distribution of the electric potential of the entire transparent resistive film 132 can be further improved because the second resistive film removal regions 233 are formed after measuring electric potential (after Step S108 of FIG. 3). Further, the potential data measured in Step S108 can be used in a case of performing the same processes as Steps S102 and S104. Thus, after potential measurement is performed on a sample in Step S108, the second resistive film removal regions 233 can be formed in Step S112 according to the measured data. Thereby, manufacturing efficiency can be improved.

Figure 5A:
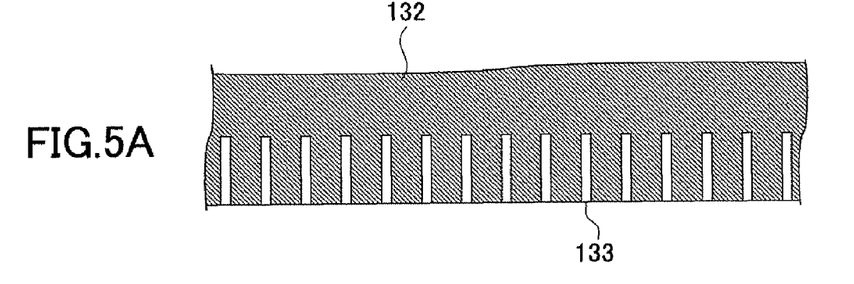
FIGS. 5A-5D are top plan views illustrating another configuration of first and second resistive film removal regions formed by the manufacturing method according to an embodiment of the present invention.
Figure 5B:
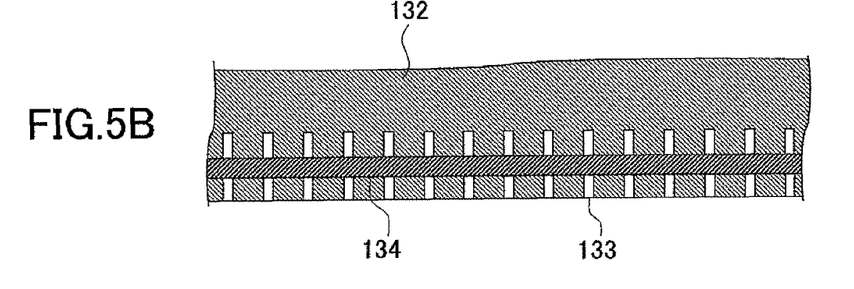
Figure 5C:
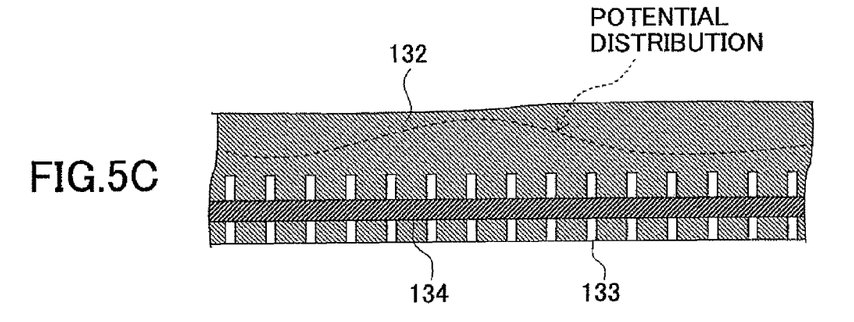
Figure 5D:
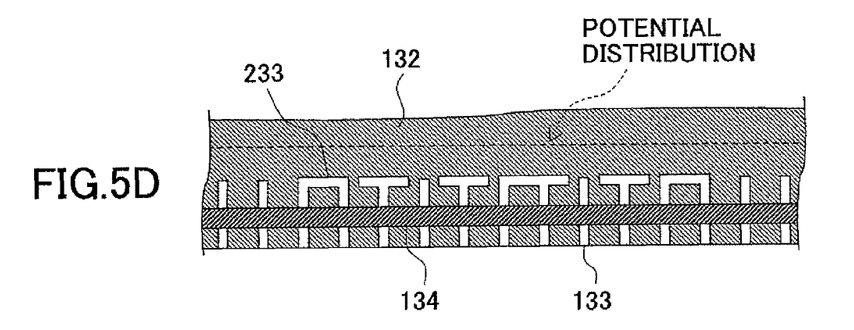

FIGS. 5A-5D illustrate exemplary processes for manufacturing first and second resistive film removal regions 133, 233 having configurations different from those described above. FIG. 5A illustrates a state where the first resistive film removal regions 133 are formed in Step S102. FIG. 5B illustrates a state where the common electrode is formed in Step S104. FIG. 5C illustrates potential distribution of the transparent resistive film 132 having the first resistive removal regions 133 and the common electrode 134 formed thereon in a case where voltage is applied to the common electrode 134. Although distortion of the potential distribution on the transparent resistive film 132 is relieved by the forming of the first resistive film removal regions 133, some areas where potential distribution is inconsistent (not uniform) still remain on the transparent resistive film 132 as illustrated in FIG. 5C. Then, as illustrated in FIG. 5D, potential distribution becomes more uniform by forming the second resistive film removal regions 233 connected to the first resistive film removal regions 133 in Step S112. Thus, by the forming of the second resistive film removal regions 233, uniformity of potential distribution can be further improved.

The data of the second resistive film removal regions 233 calculated in Step S110 may be stored in the recording medium 60, so that the second resistive film removal regions 233 can be formed in Step S112 according to the data stored in the recording medium 60. More specifically, in this embodiment, it is possible to form the second resistive removal regions 233 according to the data of the second resistive removal regions 233 stored in the recording medium 60 after forming the first lower substrate 121 (it is possible to form the second resistive removal regions 233 according to the data stored in the recording medium 60 in terms of forming a second lower substrate and thereafter). Thus, the lower substrate 121 can be manufactured without performing the processes performed in Steps S108 and S110. As a result, manufacturing efficiency can be improved.

Then, a first insulating film 135 having first to fourth through-holes 151-1, 151-2, 151-3, 151-4 are formed. More specifically, in this embodiment, the first insulating film 135 is formed by printing a pattern of paste of an insulating material by screen printing and thereafter baking the paste.

Then, first to fourth interconnects 136-1, 136-2, 136-3, 136-4 which is formed of, for example, Ag, is formed on the first insulating film 135. More specifically, in this embodiment, first to fourth interconnects 136-1, 136-2, 136-3, 136-4 are formed by printing a pattern of paste including Ag by screen printing and thereafter baking the paste.

Then, a second insulating film 136 is formed. More specifically, in this embodiment, the second insulating film 136 is formed by printing a pattern of paste including an insulating material by screen printing and thereafter baking the paste.

With the above-described processes, the lower substrate 121 can be manufactured.

[Coordinate Detector]

Next, a coordinate detector manufactured by a manufacturing apparatus according to an embodiment of the present invention is described. More specifically, in the following description, a lower substrate 121 is manufactured by a manufacturing apparatus according to an embodiment of the present invention.

[System Configuration]

Figure 6:
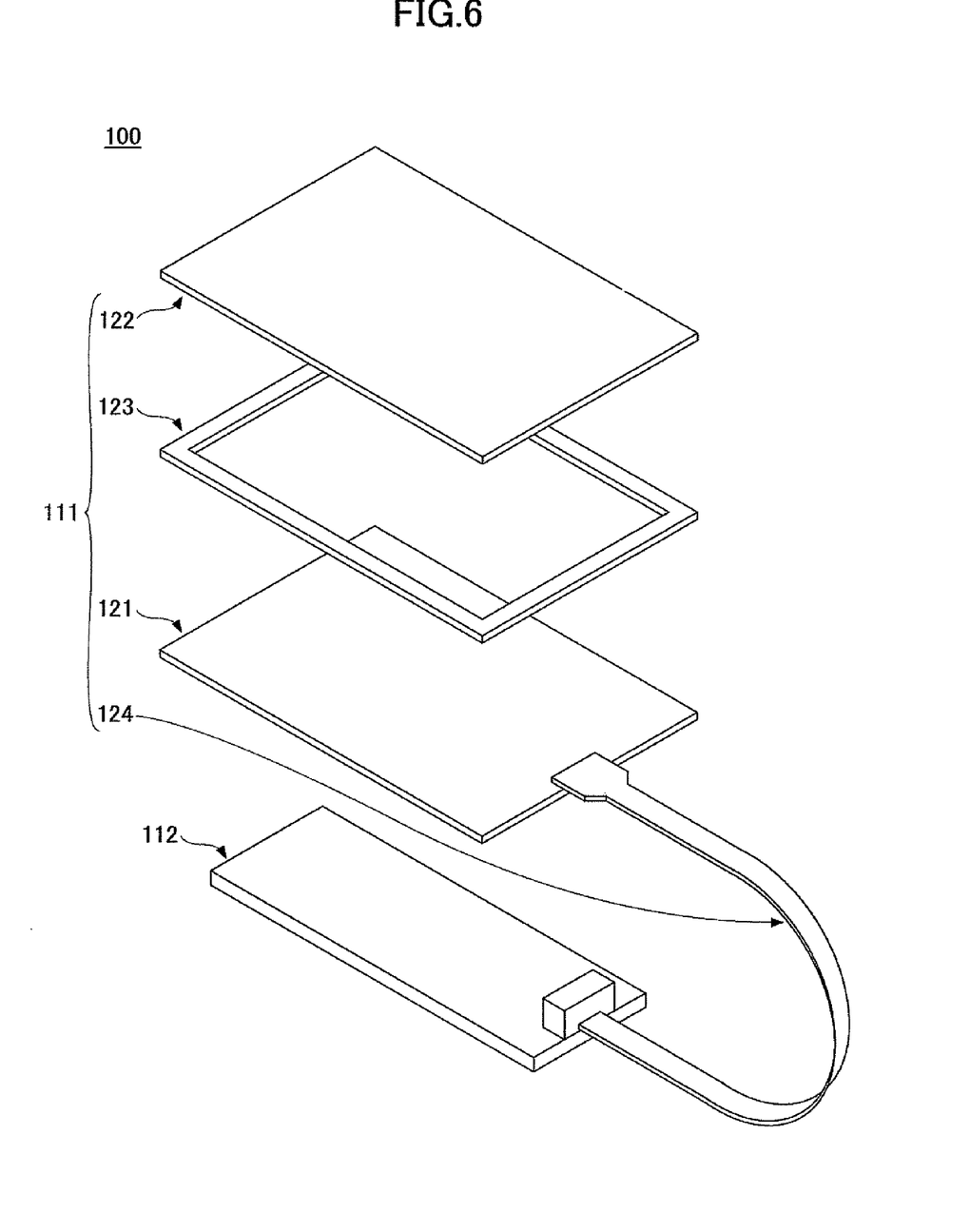
FIG. 6 is a diagram illustrating a system configuration in a coordinate detector according to an embodiment of the present invention.

FIG. 6 is a diagram illustrating a system configuration in a coordinate detector according to this embodiment. In this embodiment, a description is given of a so-called five-wire analog resistive-film touch panel as a coordinate input system 100. The coordinate input system 100 according to this embodiment includes a panel part 111 and an interface board 112.

The panel part 111 includes a lower substrate 121, an upper substrate 122, a spacer 123, and a flexible printed circuit (FPC) cable 124. The lower substrate 121 and the upper substrate 122 are adhered through the spacer 123. The spacer 123, which is formed of an insulating double-faced tape or the like, bonds the lower substrate 121 and the upper substrate 122 together with a predetermined gap between the lower substrate 121 and the upper substrate 122. The FPC cable 124, which has first through five interconnects (not illustrated) formed on a flexible printed board (not illustrated), is connected to the lower substrate 121 by bonding an anisotropic conductive film thereto by thermocompression bonding.

[Lower Substrate 121]

Next, a description is given, with reference to FIGS. 7A through 7E, of a configuration of the lower substrate 121.

Figure 7A:
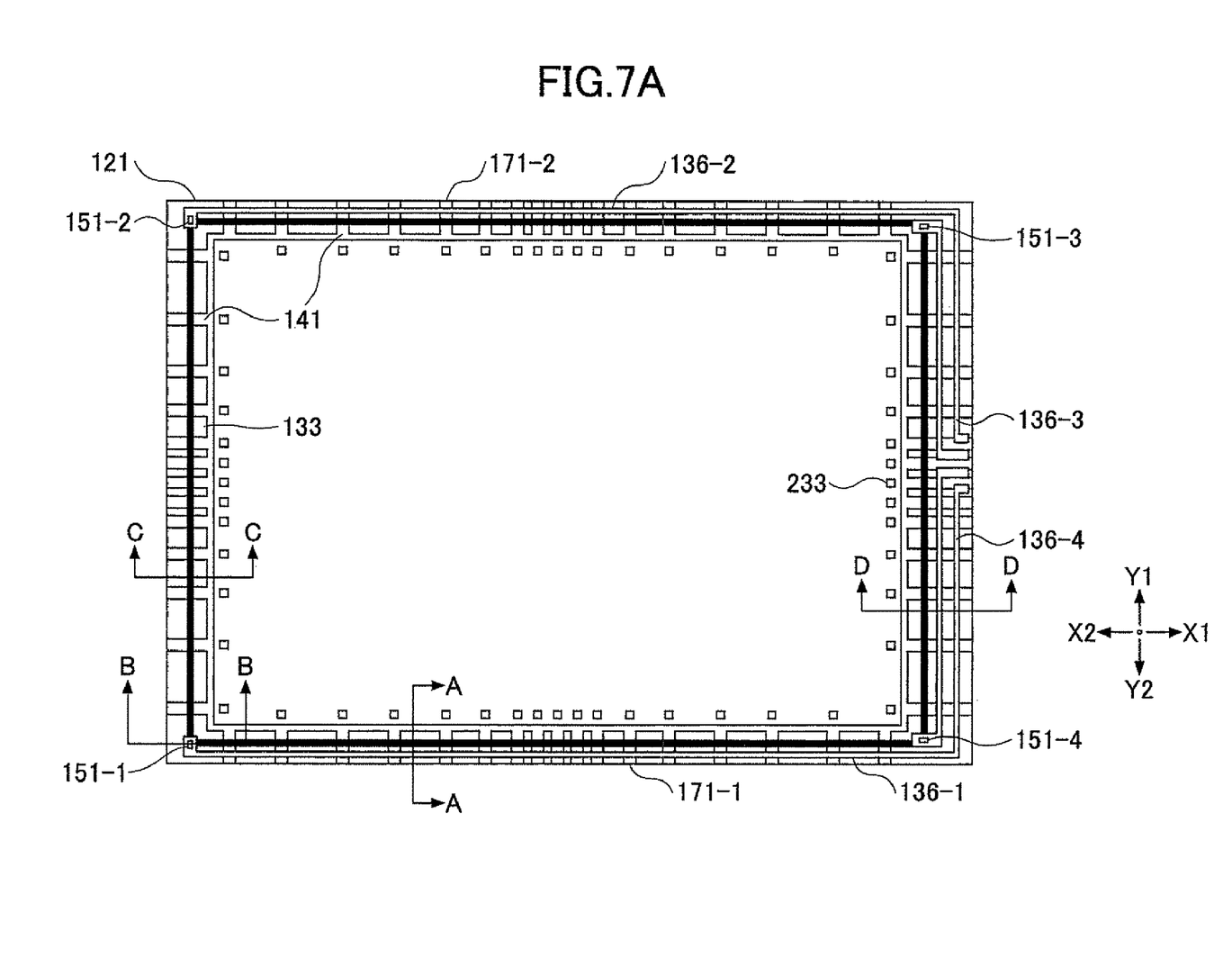
FIGS. 7A-7E are diagrams for describing a configuration of a panel part including a lower substrate according to an embodiment of the present invention.
Figure 7B:
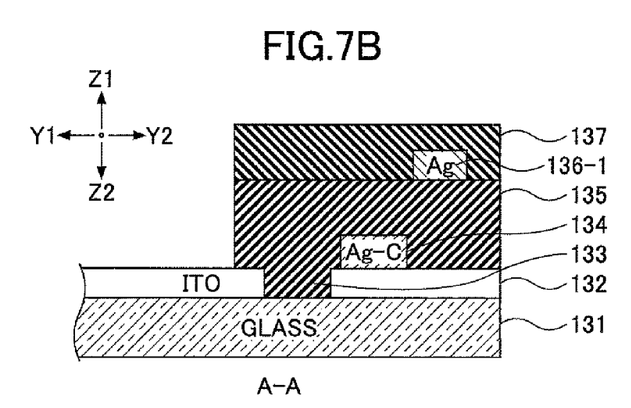
Figure 7C:
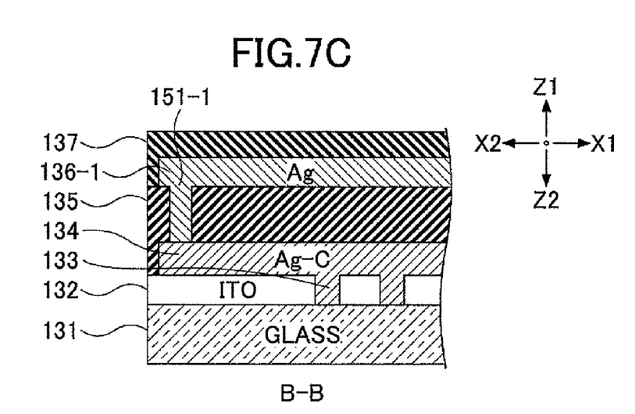
Figure 7D:
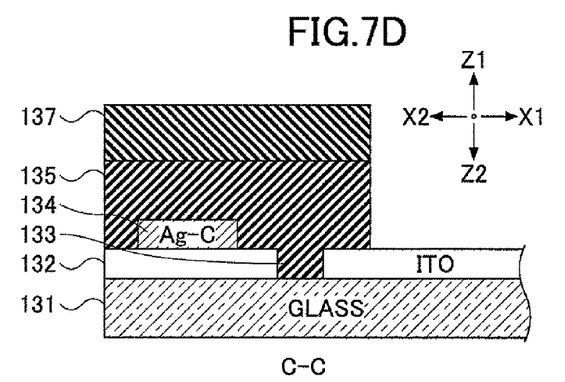
Figure 7E:
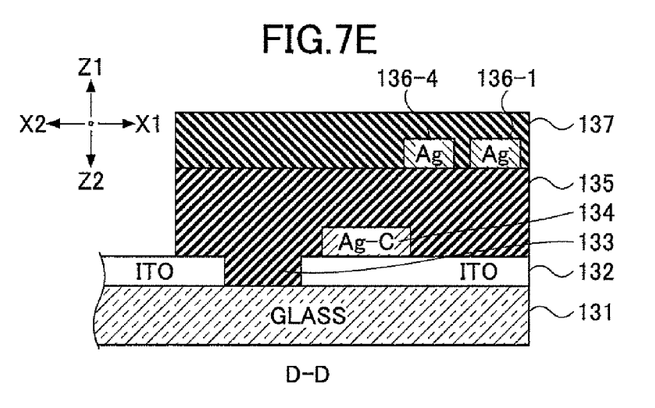

FIG. 7A is a plan view of the lower substrate 121. FIG. 7B is a cross-sectional view of the lower substrate 121 taken along the line A-A of FIG. 7A. FIG. 7C is a cross-sectional view of the lower substrate 121 taken along the line B-B of FIG. 7A. FIG. 7D is a cross-sectional view of the lower substrate 121 taken along the line C-C of FIG. 7A. FIG. 7E is a cross-sectional view of the lower substrate 121 taken along the line D-D of FIG. 7A.

The lower substrate 121 includes a glass substrate 131, a transparent resistive film 132, the first resistive film removal regions 133, a common electrode 134, a first insulating film 135, interconnects 136-1, 136-2, 136-3, and 136-4, and a second insulating film 137. The interconnects 136-1 through 136-4 may also be denoted collectively by reference numeral 136.

The transparent resistive film 132 is formed over the substantially entire surface of the glass substrate 131. The transparent resistive film 132, which is formed by depositing ITO (Indium Tin Oxide) or the like by a method such as vacuum evaporation, is a film that transmits visible light and has a predetermined resistance.

[First Resistive Film Removal Region 133]

First resistive film removal regions 133 are provided in regions where the common electrode 134 is formed in the peripheral part of the glass substrate 131.

Figure 8:
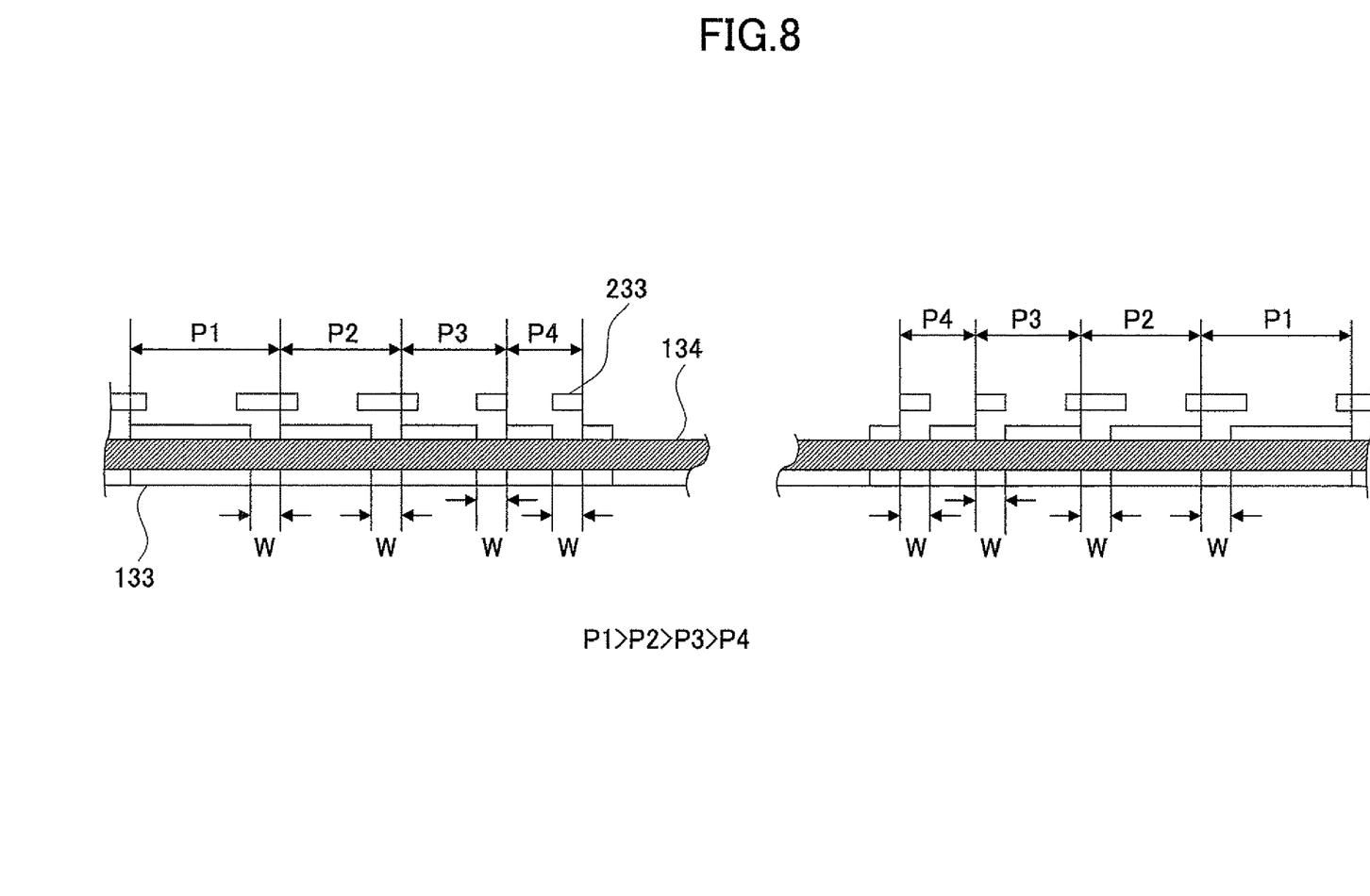
FIG. 8 is a plan view illustrating a part of first and second resistive film removal regions according to an embodiment of the present invention.

According to this embodiment, as illustrated in FIG. 8A, the first resistive film removal regions 133 are formed at equal intervals W. That is, as described below, the electric potential application parts 141, each formed between corresponding adjacent two of the first resistive film removal regions 133, are formed with the same width. The first resistive film removal regions 133 are formed at a relatively wide (large) pitch around the ends of each of a first side 171-1, a second side 171-2, a third side 171-3, and a fourth side 171-4 of the lower substrate 121, and the pitch becomes narrower (smaller) toward the center of each of the first through fourth sides 171-1 through 171-4. For example, the first resistive film removal regions 133 are formed at a pitch that varies (narrows) from P1 to P2 to P3 to P4 . . . (P1>P2>P3>P4 . . . ) from each end toward the center as illustrated in FIG. 8.

[Second Resistive Film Removal Region 133]

Second resistive film removal regions 233 are provided in an area more inward than the first resistive film removal regions 133 and the common electrode 134. The second resistive film removal regions 233 are formed in a manner obstructing the supply of potential between the first resistive film regions 133. The overall uniformity of the resistance film 132 can be increased according to how much the second resistive film removal regions 233 obstruct the supply of potential.

[Electric Potential Application Part 141]

Electric potential application parts (parts that apply electric potential) 141 correspond to a first area in the transparent resistive film 132 between corresponding adjacent two of the first resistive film removal regions 133 and a second area in the transparent resistive film 132 between corresponding adjacent two of the second resistive film removal regions 233. Accordingly, potential is applied to the entire transparent resistive film 132 through the first and second areas of the transparent resistive film 132. According to this embodiment, referring to FIG. 7A, the electric potential application parts 141 are formed at a relatively wide (large) pitch around the ends of each of the first side 171-1, the second side 171-2, the third side 171-3, and the fourth side 171-4 of the lower substrate 121, and are formed at a relatively narrow (small) pitch in the center of each of the first through fourth sides 171-1 through 171-4. This configuration reduces the distortion of a distribution of electric potential in the first side 171-1, the second side 171-2, the third side 171-3, and the fourth side 171-4, where the distribution of electric potential is likely to be distorted inward greatly, thus enabling a uniform distribution of electric potential in the transparent resistive film 132. As a result, it is possible to detect coordinate positions with greater accuracy.

The shape of the first and second resistive film removal areas 133, 233 is not limited to a particular shape as long as the shape enables potential can be uniformly distributed.

[Common Electrode 134]

The common electrode, which is formed of, for example, Ag—C, is formed in the resistive film removal regions 133 and on the transparent resistive film 132 between each adjacent two of the resistive film removal regions 133.

[First Insulating Film 135]

The first insulating film 135 is stacked (formed) on the resistive film removal regions 133 to cover the common electrode 134. A first through-hole 151-1, a second through-hole 151-2, a third through-hole 151-3, and a fourth through-hole 151-4 are formed in the first insulating film 135 at the corresponding four corners of the lower substrate 121. The first through fourth through-holes 151-1 through 151-4 form a drive voltage application part.

[First through Fourth Interconnects 136-1 through 136-4]

The first interconnect 136-1, which is formed of, for example, a low resistance material such as Ag, is formed on the first insulating film 135 along the first side 171-1 of the lower substrate 121. The first interconnect 136-1 is formed to fill in the first through-hole 151-1 formed in the first insulating film 135. Further, the first interconnect 136-1 is connected to the first interconnect of the FPC cable 124.

The second interconnect 136-2, which is formed of, for example, a low resistance material such as Ag, is formed on the first insulating film 135 along the second side 171-2, opposed to the first side 171-1, of the lower substrate 121. The second interconnect 136-2 is formed to fill in the second through-hole 151-2 formed in the first insulating film 135. Further, the second interconnect 136-2 is connected to the second interconnect of the FPC cable 124.

The third interconnect 136-3, which is formed of, for example, a low resistance material such as Ag, is formed on the first insulating film 135 along the half of the third side 171-3, perpendicular to the first side 171-1 and the second side 171-2, of the lower substrate 121, which half is on the side of the second side 171-2. The third interconnect 136-3 is formed to fill in the third through-hole 151-3 formed in the first insulating film 135. Further, the third interconnect 136-3 is connected to the third interconnect of the FPC cable 124.

The fourth interconnect 136-4, which is formed of, for example, a low resistance material such as Ag, is formed on the first insulating film 135 along the half of the third side 171-3, perpendicular to the first side 171-1 and the second side 171-2, of the lower substrate 121, which half is on the side of the first side 171-1. The fourth interconnect 136-4 is formed to fill in the fourth through-hole 151-4 formed in the first insulating film 135. Further, the fourth interconnect 136-4 is connected to the fourth interconnect of the FPC cable 124.

The second insulating film 137 is formed on the first insulating film 135 so as to cover the first interconnect 136-1, the second interconnect 136-2, the third interconnection 136-3, and the fourth interconnect 136-4. Further, the upper substrate 122 is bonded to (the upper surface of) the second insulating film 137 through the spacer 123.

[Upper Substrate 122]

Figure 9A:
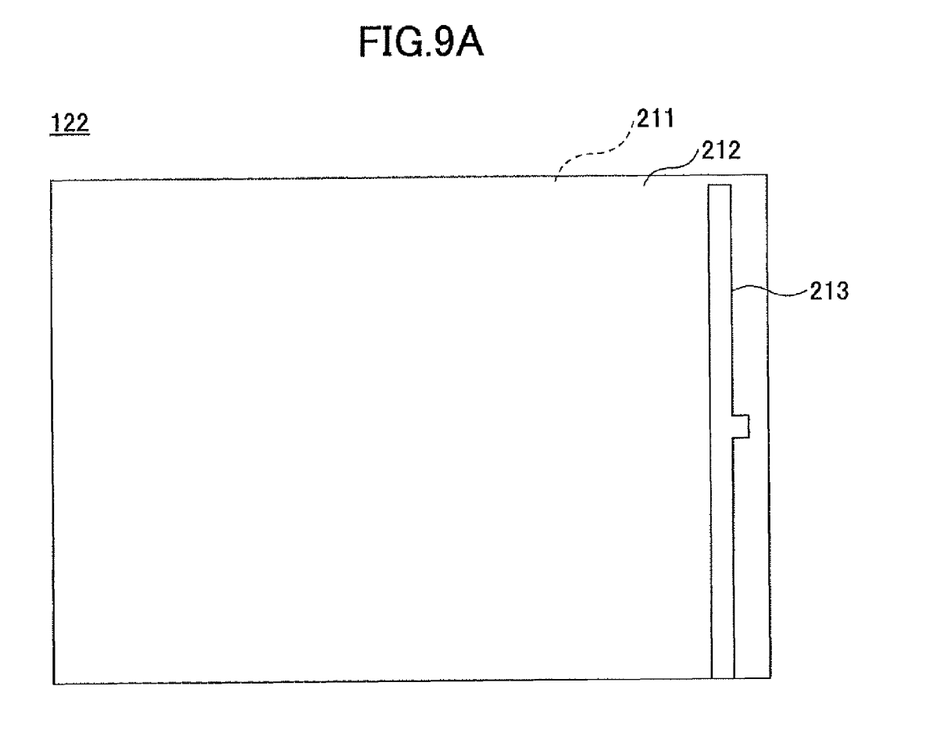
FIGS. 9A-9B are diagrams for describing a configuration of an upper substrate according to an embodiment of the present invention.
Figure 9B:
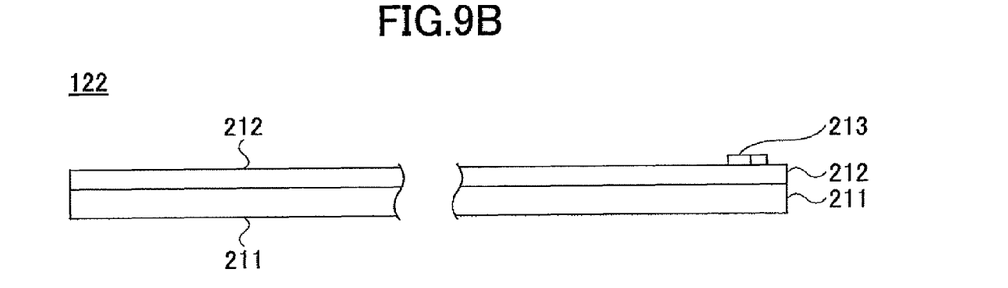

Next, a description is given, with reference to FIGS. 9A and 9B, of a configuration of the upper substrate 122.

FIG. 9A is a plan view of the upper substrate 122. FIG. 9B is a cross-sectional view of the upper substrate 122.

The upper substrate 122 includes a film substrate 211, a transparent resistive film 212, and an electrode 213. The film substrate 211 is formed of, for example, a flexible resin film such as a polyethylene terephthalate (PET) film. The transparent resistive film 212 is formed over the entire surface of the film substrate 211 on the side facing toward the lower substrate 121. The transparent resistive film 212 is formed of a transparent conductive material such as ITO. The electrode 213 is placed at the X1 end on the transparent resistive film 212 of the upper substrate 122. The electrode 213 is connected to the fifth interconnect of the FPC cable 124, which is connected to the lower substrate 121 through a contact (not illustrated). Coordinate positions are detected by detecting the electric potential of the lower substrate 121 with the interface board 112 using this upper substrate 122 as a probe.

[Detection Operation]

Next, a description is given of an operation for detecting a coordinate position in a coordinate detector according to this embodiment.

Figure 10:
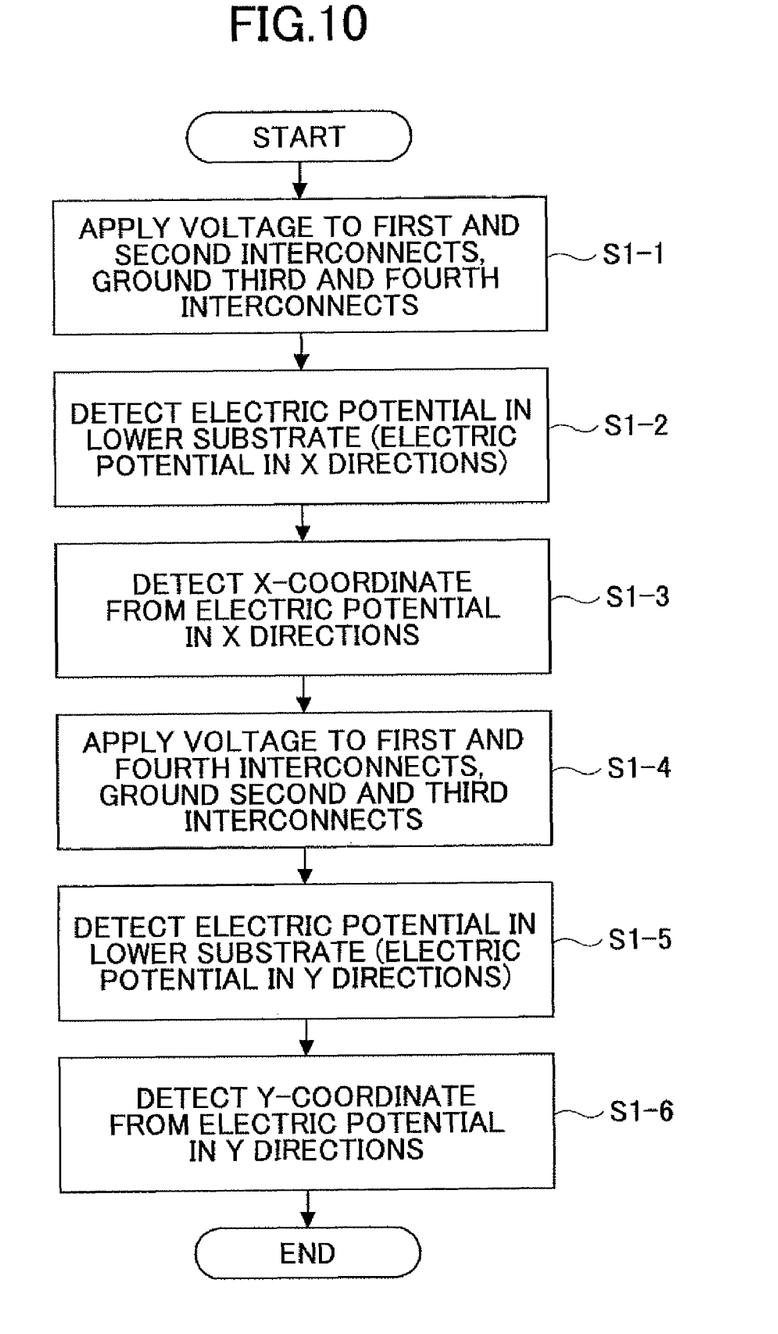
FIG. 10 is a flowchart showing operations performed by an interface board according to an embodiment of the present invention.
Figure 11A:
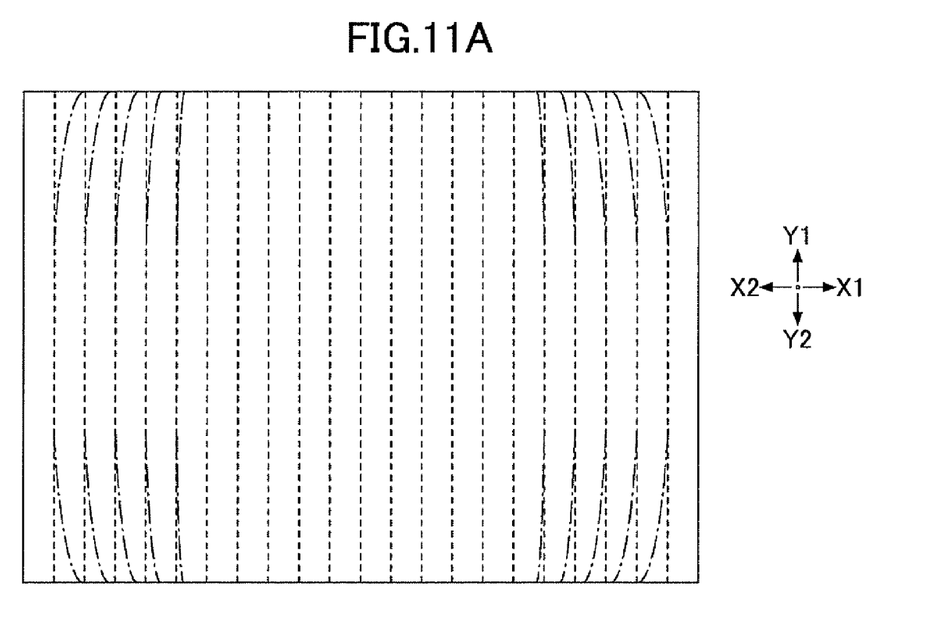
FIGS. 11A and 11B are diagrams illustrating electric potential distributions of a lower substrate according to an embodiment of the present invention.
Figure 11B:
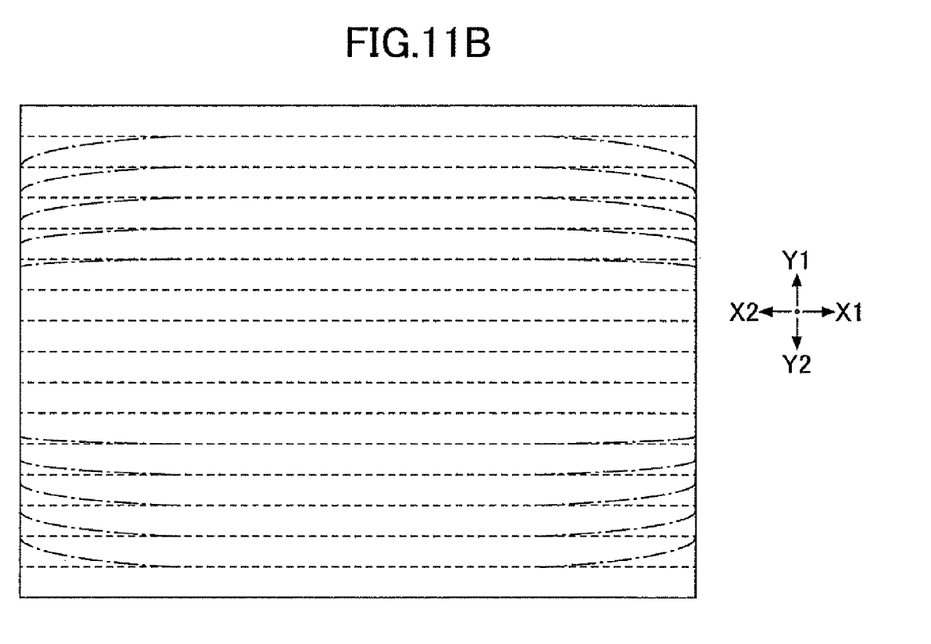

FIG. 10 is a flowchart showing operations performed by the interface board 112. FIGS. 11A and 11B are diagrams illustrating electric potential distributions of the lower substrate 121. FIG. 10A is a diagram illustrating an electric potential distribution at the time of detecting an x-coordinate, and FIG. 10B is a diagram illustrating an electric potential distribution at the time of detecting a y-coordinate.

In step S1-1, the interface board 112 applies a voltage Vx to the first interconnect 136-1 and the second interconnect 136-2, and grounds the third interconnect 136-3 and the fourth interconnect 136-4. Thereby, a uniform electric potential distribution can be generated in the transparent resistive film 132 as indicated by broken lines in FIG. 11A. The electric potential distribution according to a related art example is distorted as indicated by single-dot chain lines in FIG. 11A. Therefore, according to this embodiment, it is possible to detect a precise x-coordinate.

Next, in step S1-2, the interface board 112 detects the electric potential of the lower substrate 121. Then, in step S1-3, the interface board 112 detects an x-coordinate corresponding to the electric potential of the lower substrate 121.

Next, in step S1-4, the interface board 112 applies a voltage Vy to the first interconnect 136-1 and the fourth interconnect 136-4, and grounds the second interconnect 136-2 and the third interconnect 136-3. Thereby, a uniform electric potential distribution can be generated in the transparent resistive film 132 as indicated by broken lines in FIG. 11B. The electric potential distribution according to a related art example is distorted as indicated by single-dot chain lines in FIG. 11B. Therefore, according to this embodiment, it is possible to detect a precise y-coordinate.

Next, in step S1-5, the interface board 112 detects the electric potential of the lower substrate 121. Then, in step S1-6, the interface board 112 detects a y-coordinate corresponding to the electric potential of the lower substrate 121.

According to this embodiment, the interconnects 136-1 through 136-4 are stacked over the common electrode 134. Accordingly, it is possible to reduce the frame size of the panel part 111. Further, the electric potential application parts 141 enable the electric potential applied to the transparent resistive film 132 of the lower substrate 121 at the time of detecting an x-coordinate or a y-coordinate to be distributed uniformly in the detection region. Accordingly, it is possible to detect coordinates with greater accuracy.

In the above-described embodiment of the present invention, although ITO is used for the transparent resistive film, other material containing, for example, indium oxide, tin oxide, zinc oxide or antimony trioxide and exhibiting a transparent property in a visible range of wavelengths.

Further, the present invention is not limited to these embodiments, but variations and modifications may be made without departing from the scope of the present invention.

The present application is based on Japanese Priority Application No. 2008-130858 filed on May 19, 2008, with the Japanese Patent Office, the entire contents of which are hereby incorporated by reference.

What is claimed is:

1. A method for manufacturing a coordinate detector having a resistive film formed on a substrate formed of an insulating material and a common electrode for applying a voltage to the resistive film, the substrate having a quadrangular shape, the method comprising the steps of:
    a) forming first resistive film removal regions by removing predetermined first regions of the resistive film provided along a peripheral edge of the substrate;
    b) forming the common electrode on the first resistive film removal regions;
    c) applying voltage to the resistive film;
    d) measuring an electric potential of the resistive film;
    e) calculating second resistive film removal region data according to the measured electric potential; and
    f) forming second resistive film removal regions by irradiating a laser beam to predetermined second regions of the resistive film according to the calculated second resistive film removal region data;
    wherein the step d) is performed between the step a) and the step f).

2. The method as claimed in claim 1, further comprising the steps of:
   storing the second resistive film removal region data; and
   repeating the step f) according to the stored second resistive film removal region data.

3. The method as claimed in claim 1, further comprising the steps of:
   placing the substrate on a moving table that is movable in at least two-dimensional directions; and
   moving the moving table while irradiating the laser beam according to the calculated second resistive film removal region data.

4. The method as claimed in claim 1, wherein the resistive film includes Indium Tin Oxide (ITO), indium oxide, tin oxide, zinc oxide or antimony trioxide.

5. The method as claimed in claim 1, wherein the substrate and the resistive film exhibit a transparent property in a visible range of wavelengths.

6. The method as claimed in claim 1, wherein the wavelength of the laser beam ranges from 340-420 nm.

* * * * *